(12) United States Patent
Hamilton

(10) Patent No.: US 8,572,100 B2
(45) Date of Patent: Oct. 29, 2013

(54) METHOD AND SYSTEM FOR RECORDING SEARCH TRAILS ACROSS ONE OR MORE SEARCH ENGINES IN A COMMUNICATIONS NETWORK

(76) Inventor: Nigel Hamilton, Kilburn (GB)

( * ) Notice: Subject to any disclaimer, the term of this patent is extended or adjusted under 35 U.S.C. 154(b) by 926 days.

(21) Appl. No.: 10/597,236

(22) PCT Filed: Dec. 15, 2004

(86) PCT No.: PCT/AU2004/001763
§ 371 (c)(1),
(2), (4) Date: Sep. 26, 2006

(87) PCT Pub. No.: WO2005/069161
PCT Pub. Date: Jul. 28, 2005

(65) Prior Publication Data
US 2009/0030876 A1    Jan. 29, 2009

(30) Foreign Application Priority Data

Jan. 19, 2004    (AU) ................................ 2004900248

(51) Int. Cl.
*G06F 17/30*    (2006.01)
(52) U.S. Cl.
USPC ........................................................ 707/750
(58) Field of Classification Search
None
See application file for complete search history.

(56) References Cited

U.S. PATENT DOCUMENTS

| | | | |
|---|---|---|---|
| 6,035,332 A * | 3/2000 | Ingrassia et al. | 709/224 |
| 6,098,069 A * | 8/2000 | Yamaguchi | 707/102 |
| 6,195,679 B1 | 2/2001 | Bauersfeld | |
| 6,226,655 B1 * | 5/2001 | Borman et al. | 715/207 |
| 6,243,091 B1 * | 6/2001 | Berstis | 715/839 |
| 6,377,983 B1 * | 4/2002 | Cohen et al. | 709/217 |
| 6,415,285 B1 * | 7/2002 | Kitajima et al. | 707/5 |
| 6,633,316 B1 * | 10/2003 | Maddalozzo et al. | 715/854 |
| 6,849,045 B2 * | 2/2005 | Iliff | 600/300 |
| 6,934,702 B2 * | 8/2005 | Faybishenko et al. | 707/3 |
| 6,968,332 B1 * | 11/2005 | Milic-Frayling et al. | 707/3 |
| 6,988,240 B2 * | 1/2006 | Grober et al. | 715/234 |
| 7,072,886 B2 * | 7/2006 | Salmenkaita et al. | 707/4 |
| 7,080,069 B2 * | 7/2006 | Abe et al. | 707/4 |
| 7,099,871 B2 * | 8/2006 | Faybishenko et al. | 707/10 |

(Continued)

FOREIGN PATENT DOCUMENTS

| WO | WO 00/72199 | 5/2000 |
|---|---|---|
| WO | WO00/72199 A | 11/2000 |
| WO | WO01/57720 A | 8/2001 |
| WO | WO02/35335 | 5/2002 |

OTHER PUBLICATIONS

Frew et al, "The Alexandria Digital Library Architecture", Jan. 1, 2000, International Journal on Digital Libraries, Springer-Verlag, vol. 2, Is. 4, p. 259-268, <Retrieved from EBSCO May 17, 2009>.*

(Continued)

*Primary Examiner* — Khanh Pham

(74) *Attorney, Agent, or Firm* — Kilpatrick Townsend & Stockton LLP

(57) ABSTRACT

An automated method for recording sites accessed by a client in a communications network, the method including the steps of: detecting submission of a search query from the client to one or more search engines; and recording a search trail of one or more parameters of sites accessed consecutively following return of search query results to the client.

36 Claims, 6 Drawing Sheets

(56) References Cited

U.S. PATENT DOCUMENTS

| | | | |
|---|---|---|---|
| 7,188,141 B2* | 3/2007 | Novaes | 709/205 |
| 7,225,407 B2* | 5/2007 | Sommerer et al. | 715/738 |
| 7,266,546 B2* | 9/2007 | Son | 707/3 |
| 7,275,063 B2* | 9/2007 | Horn | 707/102 |
| 7,725,526 B1* | 5/2010 | Kraft | 709/203 |
| 2001/0037325 A1* | 11/2001 | Biderman et al. | 707/1 |
| 2001/0054020 A1* | 12/2001 | Barth et al. | 705/37 |
| 2002/0087522 A1* | 7/2002 | MacGregor et al. | 707/3 |
| 2002/0120505 A1* | 8/2002 | Henkin et al. | 705/14 |
| 2002/0156779 A1* | 10/2002 | Elliott et al. | 707/6 |
| 2002/0165955 A1 | 11/2002 | Johnson | |
| 2002/0198869 A1* | 12/2002 | Barnett | 707/3 |
| 2003/0051027 A1* | 3/2003 | Aupperle et al. | 709/224 |
| 2003/0120670 A1 | 6/2003 | Nareddy | |
| 2003/0191737 A1* | 10/2003 | Steele et al. | 707/1 |
| 2004/0001104 A1 | 1/2004 | Sommerer et al. | |
| 2004/0003351 A1* | 1/2004 | Sommerer et al. | 715/517 |
| 2004/0073691 A1* | 4/2004 | Sun | 709/230 |
| 2004/0083274 A1* | 4/2004 | Katiyar et al. | 709/217 |
| 2004/0167890 A1* | 8/2004 | Eyal | 707/3 |
| 2004/0193612 A1* | 9/2004 | Chang | 707/10 |
| 2005/0097189 A1* | 5/2005 | Kashi | 709/217 |
| 2005/0257400 A1* | 11/2005 | Sommerer et al. | 36/13 |
| 2005/0289122 A1* | 12/2005 | Jung et al. | 707/3 |
| 2006/0062252 A1* | 3/2006 | Jung et al. | 370/469 |
| 2008/0033982 A1* | 2/2008 | Parikh et al. | 707/102 |

OTHER PUBLICATIONS

Cameron, "Suspicious acitivty reveals compromised server", May 2002, Hawaii Business, p. 58, <Retrieved from EBSCO May 17, 2009, www.hawaiibusiness.cc>.*

White, "Using heterogeneous components to construct online library portals", Jun. 1, 2002, The Electronic Library, vol. 20, Is. 3, p. 224-230, 268, <Retrieved from EBSCO and Proquest May 17, 2009>.*

Roth et al, "Last-Minute Bidding and the Rules for Ending Second Price Auctions: Evidence from eBay and Amazon Auctions on the Internet", Sep. 2002, American Economic Review, vol. 92, No. 4, p. 1093,-1103, <Retrieved from JSTOR May 17, 2009>.*

Costa, "Reudcing the Impact of Outliers", Apr. 2003, Mathematical Geology, vol. 35, Is. 3, p. 323-454, <Retrieved from internet May 17, 2009>.*

Morgan et al, "An Analysis of Stock Recommendations", Mar. 2003, The RAND Journal of Economics, vol. 34, No. 1, Spring 2003, p. 183-203, <Retrieved from JSTOR May 17, 2009>.*

Lee, J., et al.: *Visualization and Analysis of Clickstream Data of Online Stores for Understanding Web Merchandising*, Internet Citation, Jan. 1, 2000, URL: http://www.research.ibm.com/iac/tech-paper.html>.

Nelson, J., *Client-Side Form Validation Using JavaScript*, url:http://edg.utah.gov/developer_advisory/form_validation/validation.pdf>, Dec. 6, 2004.

Braband, C., et al., *Power-Forms: Declarative Client Site Form Field Validation*, World Wide Web, Baltzer Science Publishers, Bussum, NL, vol. 3, No. 4, Dec. 2000.

C. Bouras et al, *Introducing Navigation Graphs as a Technique for Improving WWW User Browsing* (in particular, see p. 255, "NG archiving"), Second International Conference on Web-Age Information Management, pp. 249-256, Jul. 2001.

Lee J. et al: "Visualization and Analysis of Clickstream Data of Online Stores for Understanding Web Merchandising" Internet Citation (Online), Jan. 1, 2000, retrieved from internet: Http://www.research.ibm.com/iac/tech-paper.html (retrieved on Jul. 30, 2002), section 1.

* cited by examiner

METHOD AND SYSTEM FOR RECORDING SEARCH TRAILS ACROSS ONE OR MORE SEARCH ENGINES IN A COMMUNICATIONS NETWORK

The present invention relates to a method and system for automatically recording sites accessed by a client in a communications network, and in particular to the recordal of a trail of sites consecutively accessed by the client. The invention is suitable for use in applications in which a client accesses sites from one or more servers forming part of the Internet, and it will be convenient to describe the invention in relation to that exemplary application. It should be appreciated however that the invention is not limited to that application Each day millions of searches are conducted on the Internet by using Internet search engines. These search engines are software that search for data based on some criteria. Typically, a user enters a search query and an algorithm is used to determine Hyper Text Markup Language (HTML) documents or other content that match the search query based upon a search algorithm performed by the search engine. Once the search algorithm has been executed, search results consisting of a list of links to a number of relevant HTML documents or other content are returned for display to the client. A user will click on one of the links, and the content located at that link will be served to the client. This content may provide one or more links to other sites, and depending upon their relevance the user may choose to click on one of these further links. In this way, a search trail consisting of a chain of consecutively accessed sites is created by a user.

Current search engines require searchers to rediscover a path to a desired search result each time a new search query is created. Search trails developed by an individual or other users are currently unable to be harnessed to improve the efficiency and relevance of a search conducted on the Internet.

Considerable academic research has been devoted to analysing the behaviour of web searchers. Typically this research relies on web server logs to record web usage data. However, it is impractical to merge user data from multiple servers as this requires cooperation between the server owners. Moreover, server logs only record a limited number of parameters used in Hyper Text Transfer Protocols (HTTP) GET requests, and do not enable meaningful information to be recorded for constituting a search trail. Recording all page visits by a user in a web server log results in privacy concerns for many users. Furthermore, a web server log is unable to record page visits of a user on third party servers. Recording all page visits also consumes a considerable amount of disk storage space.

Other research into user behaviour whilst browsing the Internet has described the use of HTTP proxies to intercept HTTP requests between a client-side browser and the Internet. Such systems have focused on a user's general web browsing behaviour but have not addressed a user's searching behaviour. A proxy-based solution for recording user browsing behaviour also has a number of important limitations, namely that all requests go via the proxy and excess network bandwidth is consumed, new page requests are transmitted slowly as they must pass via the proxy, and the privacy of the user is not adequately protected since all page requests are intercepted.

It would be desirable to provide an automated method and system for recording sites accessed by a client in a communications network that enables an Internet searcher to record a search and the search trail followed to find a relevant result.

It would also be desirable to enable the recordal of search trails across multiple engines.

It would also be desirable to enable the retrieval of previously generated search trails at a later time, and to enable a searcher to be able to follow search trails previously generated by themselves or other Internet searches.

One aspect of the present invention provides an automated method for recording sites accessed by a client in a communications network, the method including the steps of:

detecting submission of a search query from a client to one of a plurality of search engines; and recording a search trail of one or more parameters of sites accessed consecutively following return of search query results to the client.

The step of detecting submission of the search query may include:

detecting submission of a completed form object from the client; and determining if part of the form object matches a known search command format of any of the plurality of search engines.

The search command format may include the network address of a search engine program for executing the search query.

The search command format may further include one or more search parameters identifying a user-entered search query.

The step of detecting submission of a completed form object by the client may include:

locating form objects in an object model of content served to a client; and adding a routine to each form object to enable interception of the completed form object upon submission.

The step of locating all form objects in a document object model of content served to a client is carried out after the content has been served to the client.

The content may be an HTML document, and all form objects in a document object model of the HTML document may be located once a DocumentComplete event occurs.

The HTML document may include a GET or a POST form.

The step of recording one or more parameters of the sites accessed consecutively from the search query results may be optionally selectable at the client once the search query is detected.

The step of recording one or more parameters of the sites accessed consecutively from the search query results may include:

recording the network address of the consecutively accessed sites.

The step of recording one or more parameters of the sites accessed consecutively from the search query results may further include:

recording one or more of a search identifier, network address of a referring site, network address of the client and search term or terms entered by the user at the client.

The step of recording one or more parameters of the sites accessed consecutively from the search query results may further include:

transmitting the one or more parameters identified at the client to a trail recorder server for recordal.

The method may further include the step of initially recording the one or more parameters in a RAM table at the trail recorder server.

The method may further include the step of periodically saving RAM table data to disk-based tables at the trail recorder server.

A first disk-based table may store data characterising its search trail.

A second disk-based table may store data characterising the consecutive sites accessed in each search trail.

The number of consecutively accessed sites may be limited to a predetermined maximum.

The method may further include the step of:

maintaining an adapter table of known search command formats for a plurality of search engines.

The method may further include the step of:

periodically validating the search command formats maintained in the adapter table.

The method may further include the step of:

automatically identifying a search command format of a new search engine; and updating the adapter table.

The method may further include the step of:

collecting search information identifying a search box page of a search engine; and identifying the search command format from the search information.

The step of collecting search information may include:

collecting the HTML code of a search box; and parsing the HTML code to identify the search command format.

The method may further include the step of:

matching the search query to previous search queries to identify related search trails.

The step of matching the search query to previous search queries may include:

conducting a full text search on the search query and previous search queries.

The step of matching the search query to previous search queries may include:

limiting the related search trails to search trails resulting from search queries from a same user.

Alternatively, the related search trails may include search trails resulting from search queries from a same and other users.

The method may further include the step of:

presenting the related search trails at the client.

The step of presenting the related search trails may include:

ordering the related search results by one or more ranking criteria.

The ranking criteria may include any one or more of date, inverse document frequency match, target search engine, user identifier or trail weight indicative of the cumulative frequency of user visits to steps in a related search trail.

Another aspect of the invention provides a system for recording sites accessed by a client in a communications network, the system including:

a search query detector for detecting submission of a search query from the client to one of a plurality of search engines; and a search trail recorder for recording a search trail of one or more parameters of sites, accessed consecutively following return of search query results to the client.

The system may further include:

an adapter manager for maintaining an adapter table of known search command formats for the plurality of search engines.

The system may further include:

a trail searcher for matching the search query to previous search queries to identify-related search trails.

Another aspect of the invention provides a search query detector for use with the above described system.

A further aspect of the invention provides a search trail recorder for use with the above described system.

Yet another aspect of the invention provides an adapter manger for use with the above described system.

A still further aspect of the invention provides a trail searcher for use with the above described system.

Further aspects of the invention include computer software including a set of instructions for carrying out the method performed by the search query detector, search trail recorder, adapter manager and/or trail searcher.

The following description refers in more detail to the various features of the present invention. To facilitate an understanding, reference is made in the description to the accompanying drawings where the automated method and system is illustrated in a preferred embodiment. It is to be understood however, that the invention is not limited to the preferred embodiment as illustrated in the drawings.

Referring now to the drawings.

Figure 1:
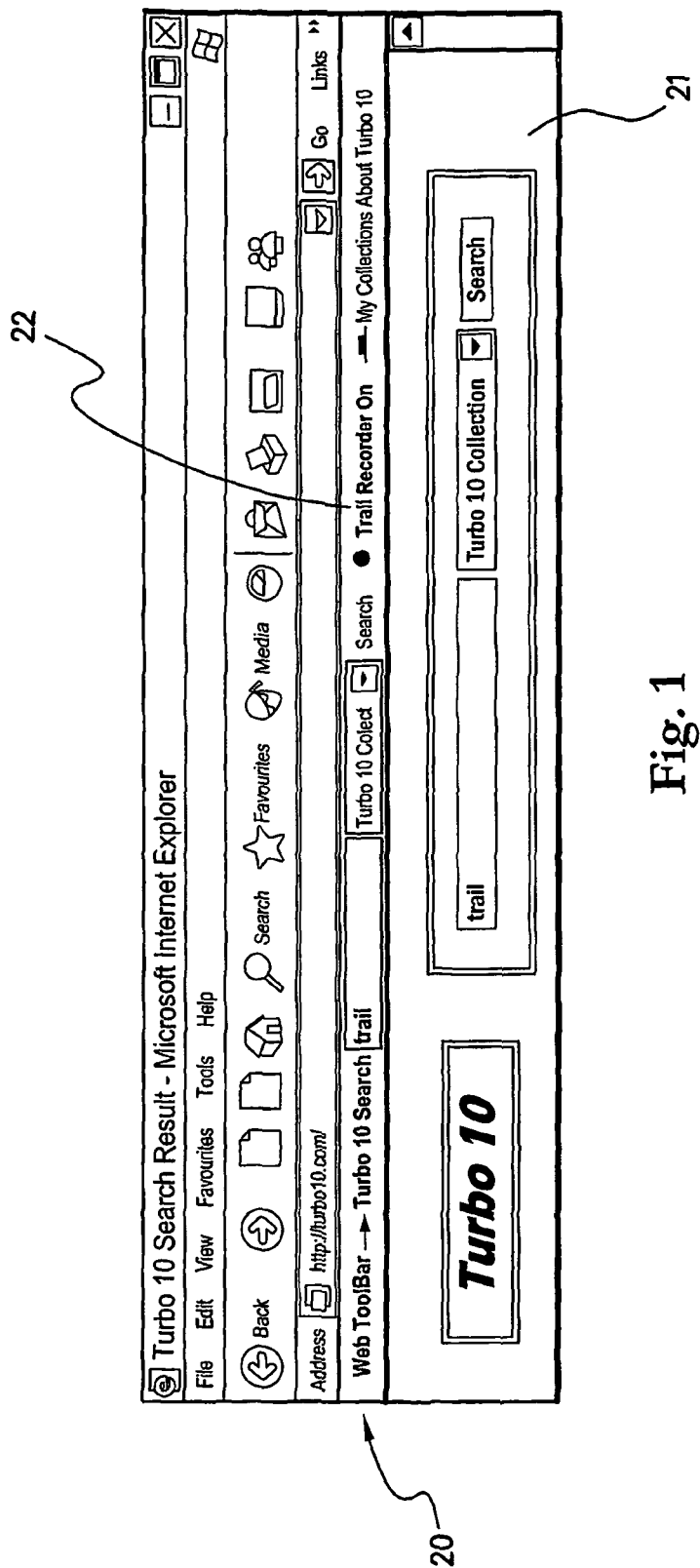
FIG. 1 is a representation of a browser toolbar forming part of a search query detector of a system for recording sites accessed by a client in a communications network according to the present invention.
Figure 2:
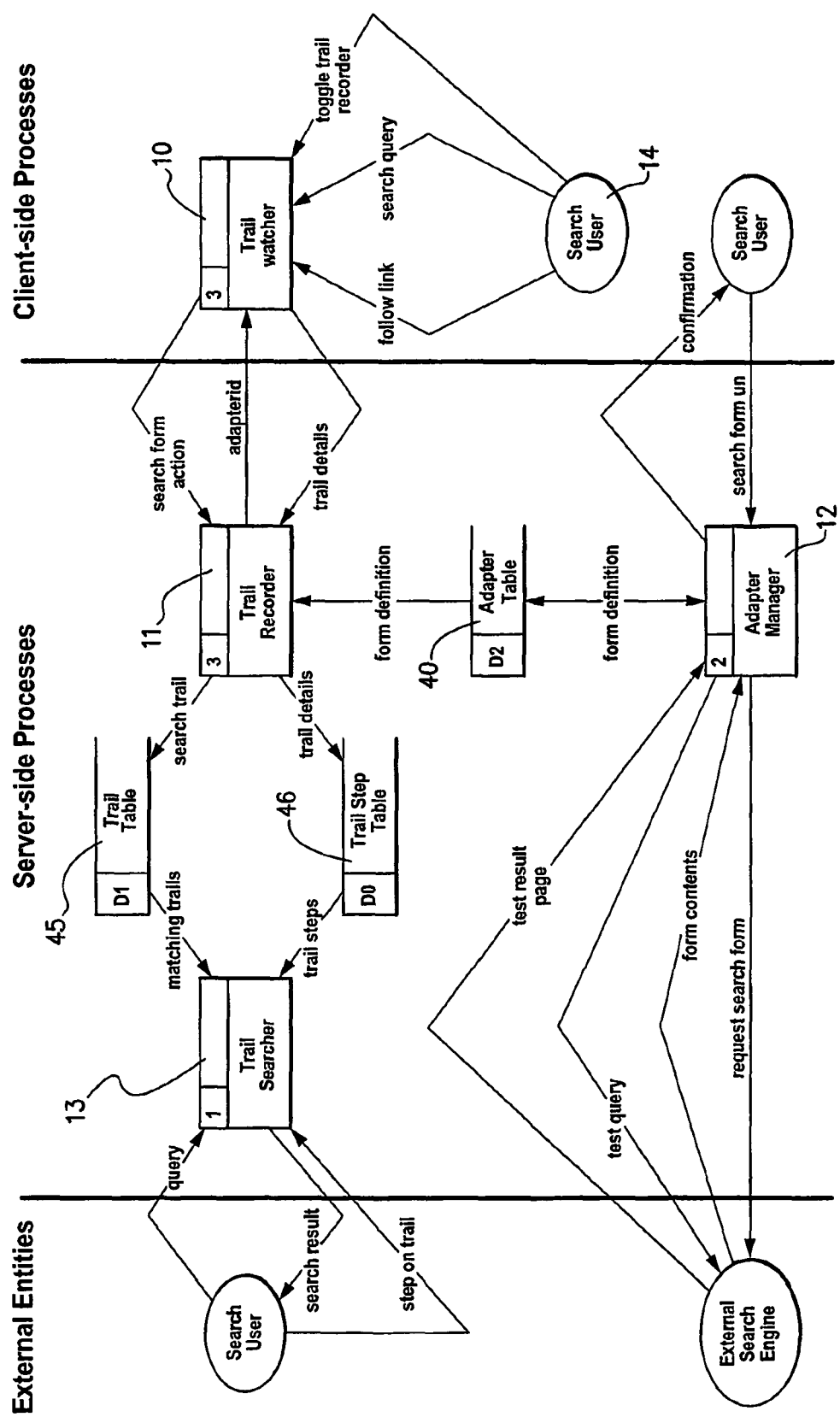
FIG. 2 is a schematic diagram of inter-related components of a system for recording sites accessed by a client in a communications network according to the present invention.

Referring now to FIGS. 1 and 2, the system for recording sites accessed by a client in a communications network (in this case, the Internet) according to one embodiment of the present invention includes the following four major components: a search query detector 10, search trail recorder 11, adapter manager 12 and trail searcher 13. The search query detector 10 is a client-side application that detects submission of a search query from a client to one or more search engines. In the example shown in FIG. 1, the search query detector 10 is embodied as a toolbar 20 operable within an Internet browser installed at a client. In other embodiments of the invention, the search query detector 10 may be embodied as a browser addon or extension, deskbar, agent, proxy or like client-side application from which data from a search form can be interpreted. By detecting a submission of the search query from a client, the trail watcher captures the start of a search trail and the subsequent web links or search trail steps, a user takes as they browse through various content served to the client looking for information that satisfies their search query. An individual search trail is recorded for each new search trail that a user enters into a search form. The trail recorder 11 subsequently records a search trail of one or more parameters of sites accessed consecutively following return of search query results to the client in the browser window 21.

The trail recorder 11 may also be adapted to capture the IP address (or other network identifier) of the user. In this way, the IP addresses of multiple users can be subsequently analysed to group users by country, organisation, department or like criteria.

The search query detector 10 is adapted to capture web browser events such as a DocumentComplete. The DocumentComplete event occurs whenever the browser has finished loading and displaying a new web page. By the time the DocumentComplete event occurs the browser has created an internal predate structure based on the Document Object Model (DOM) to store the page. Client-side scripting language such as Javascript are able to manipulate this data structure inside the memory of the browser, which in turn manipulates the corresponding elements of the web page, such as the forms and images displayed. The search query detector 10 in this example is embodied as a Javascript program that forms a toolbar within an Internet browser, and has partial or full access to the DOM of a web page. When a search user 14 clicks on a link displayed in the Internet browser window 21 and requests the serving of content from the Internet, a new web page is loaded.

Figure 3:
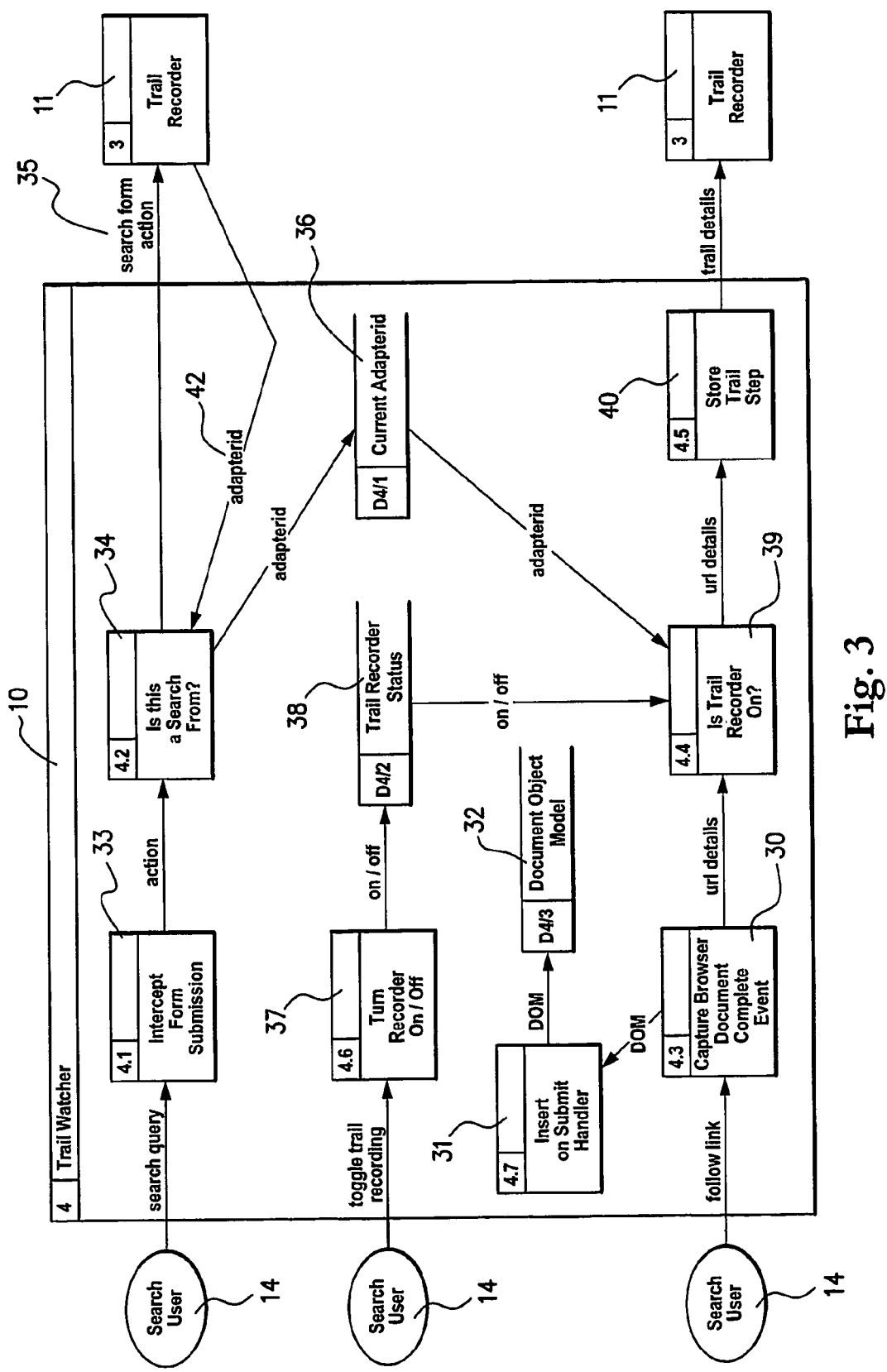
FIG. 3 is a schematic diagram of a search query detector forming part of the system of FIG. 2.

Once the content has been served to the client, a DocumentComplete event occurs, which is captured at step 30, as shown in FIG. 3. For every form object found in the web page, the search query detector 10 includes a routine to enable interception of the completed form object upon submission of the search query by the search user 14. In this embodiment, the search query detector 14 adds an onSubmit event handler to every form object inside the Document Object Model of the web page served to the client. The onSubmit handler acts to catch an onSubmit event for all forms of the document if, and when, the event occurs. The onSubmit event occurs whenever a user submits the contents of a web form to a remote server. By catching the event, the search query detector intercepts the submission of a form and ensures that the new onSubmit handler is executed before any of the forms in the document are submitted to a third party web server. For example, if a user is using the Google® search engine, the search query detector intercepts whenever a user submits a search form. Before search variables are submitted to the Google® server, they are firstly submitted to the search trail recorder 11 so that the start of a new search trail can be recorded. The insertion of the onSubmit handler occurs at step 31 in FIG. 3, whilst the updating of the Document Object Model occurs in step 32.

An example of the HTML source code of a simple search box is shown in Table 1;

TABLE 1

```
<html>
<head>
</head>
<body>
<form name =        "searchform"
    method =        "POST"
    action =        http://turbo10.com/x/search.cgi>
Search <input type = "text" size = "20" name = "query">
<input type = "submit" value = "Search">
</form>
</body>
</html>
```

Figure 4:
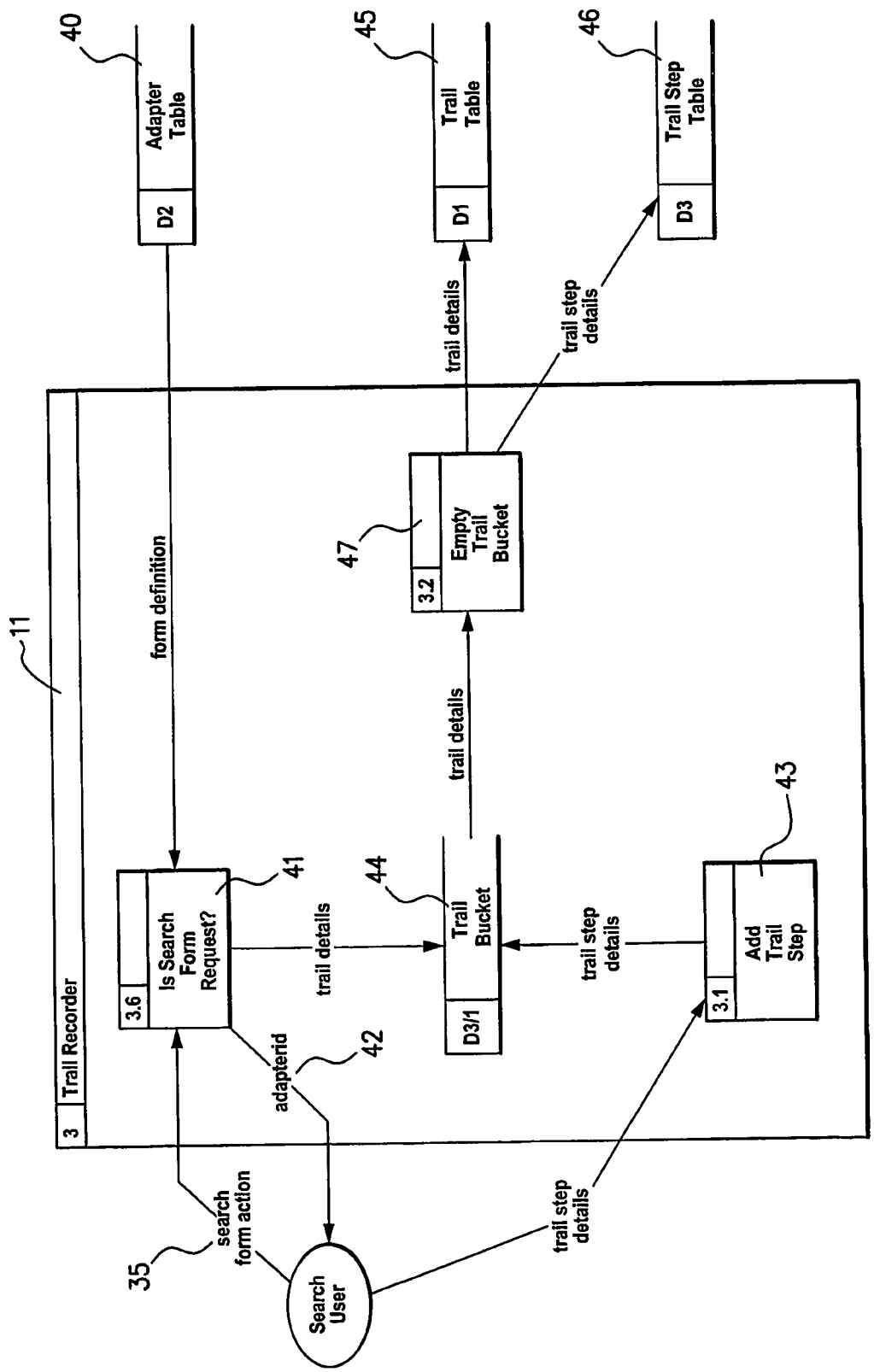
FIG. 4 is a search trail recorder forming part of the system of FIG. 2.
Figure 5:
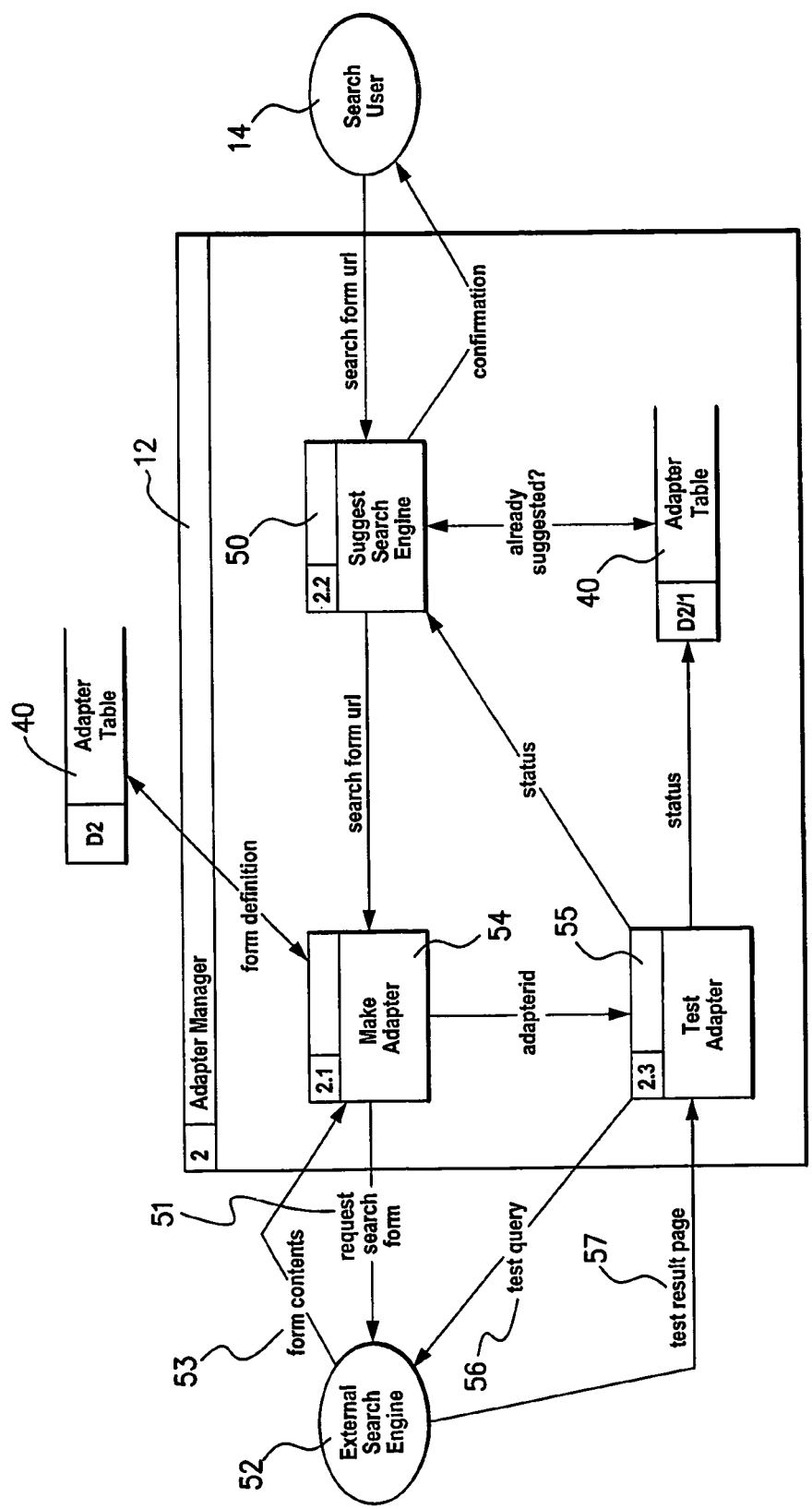
FIG. 5 is schematic diagram of an adapter manager forming part of the system of FIG. 2.
Figure 6:
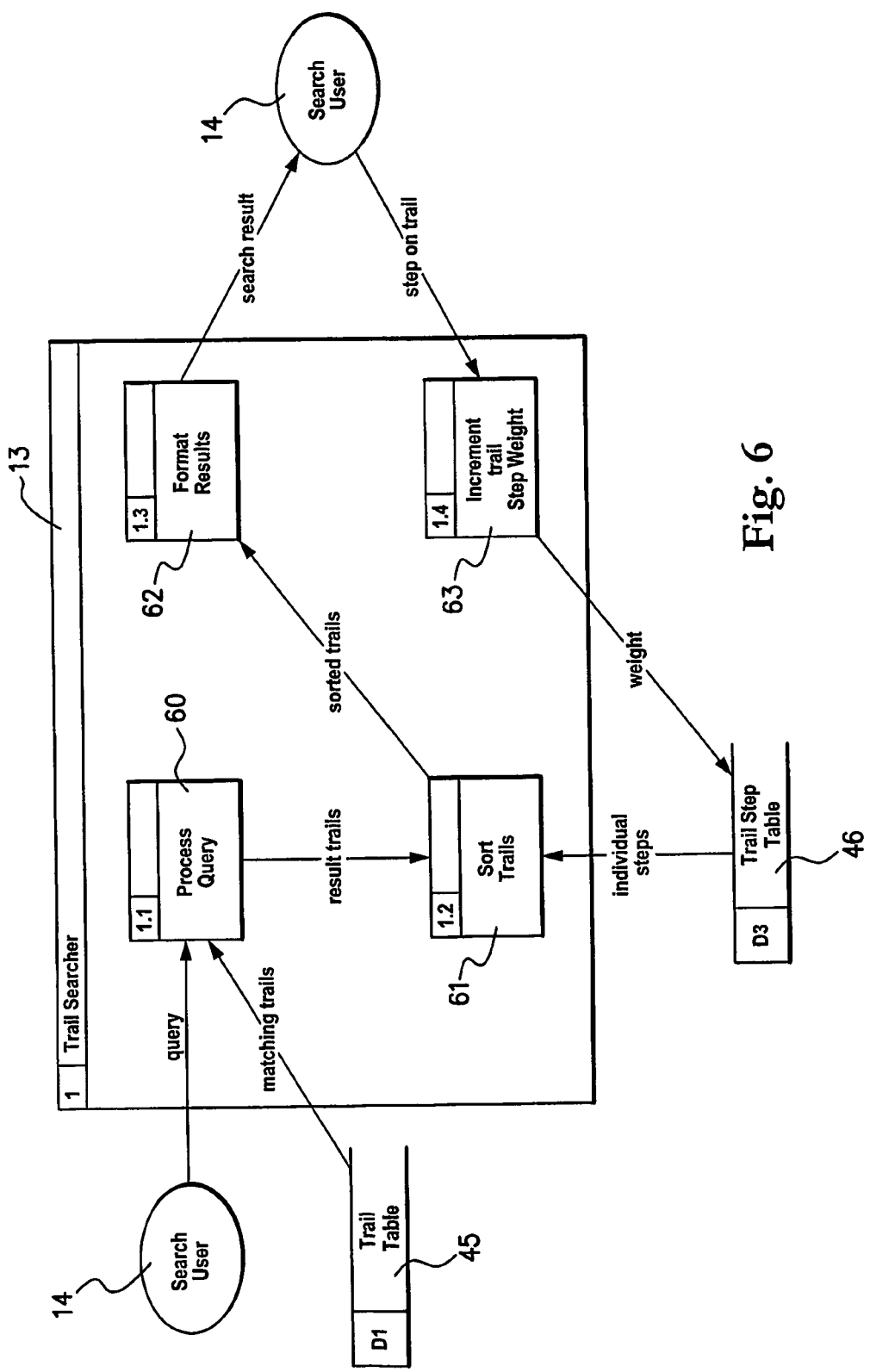
FIG. 6 is a schematic diagram of a trail searcher forming part of the system of FIG. 2.

The HTML source code includes an attribute, namely the Uniform Resource Locator (URL) of a server-side script that processes a search request. The HTML source code also includes a method attribute that determines how the parameters are to be passed to the server. The two request methods to submit HTML form data to a server are the "GET" and "POST" methods. The on Submit handler inserted into every form object of a web page served to•a client ensures that all completed search forms are intercepted, at step 33. At step 34, the action attribute of the search form is transmitted to the trail recorder 11 in order to determine whether the action attribute corresponds to an action attribute of a known search engine. The search query detector 10 is advantageously able to intercept both GET and POST form submissions. By transmitting only the action attribute of a search form submission, the search query detector 10 also ensures that no private form data Is transmitted unsecurely to the server-side trail recorder 11 that may compromise the privacy of a user, such as a logging form containing user name and password, credit card details or the like. The value of the action attribute is the URL or network address of the search engine program for executing the search query. For example, the value of the action attribute in the example of HTML source code shown in Table 1 is http://turb010.Qomlxlsearch.cgi. The on Submit handler-inserted into the form object at step 31 passes the action attribute in a separate HTTP GET request to the trail recorder 11 at step 35. Referring now to FIG. 4, the trail recorder 11, upon receipt of the HTTP GET request from the search query detector 10 strips off any parameter portion of the network address or URL of the search engine program for executing the search query so that only the scheme, host name and path remain. To maintain the privacy of the user, no form parameters are submitted to the trail recorder 11 at this time. Only the value of the action attribute is sent to the server. For example, this stripped down version of the search engine URL in the example shown in Table 1 is http://turb010.com/x/search.cgi.

Using this portion of the URL, the trail recorder 11 searches a table 40 of "Search Engine Adapters" for an action attribute that matches the action attribute value transmitted from the search query detector 10. If the adapter URL does match, then the search query detector 10 determines that the search query submitted by the user is the beginning of a new search trail. More generally, upon detection of submission of a completed form object from the client, the search query detector 10 and search trail recorder 11 determine if part of the form object matches a known search command format of any of a plurality of search engines maintained in a database of known search engine search command formats.

The matching process undertaken by the search trail recorder 11 is important to determine whether or not the form submitted from the client was a search form or another type of form submission, such as a contact us form, login form, etc. The matching process is also important in order to determine the particular search engine intended, to execute the search, as well as the search query parameters used by that search engine. The adapter table 40 of known search command formats for the various search engines known to the search trail recorder is used to identify which of the search query parameters are defaults, and which are entered by the searcher. For example, following on from the example shown in Table 1, a search HTTP GET request for a search engine URL may be http://turb010.com/x/search.cgi?q=cars&fmt=html. Two potential search query parameters arise from this request, namely "q" and "fmt". One is entered by the user in the search form, whilst the other is a default value. The adapter table 40 stores which parameter corresponds to the search query entered by the user. In this case, the search query parameter stored in the adapter table 40 is "q" so the search trail recorder 11 is able to determine that this is the beginning of a search trail for "cars" and not "html". The adapter definition stored in the adapter table 40 is able therefore to distinguish between form parameters entered by the searcher and default values, such as session identifiers, user identifiers or other hidden variables. More generally, the search command format maintained by the adapter table 40 includes not only the network address of a search engine program for executing the search query, but additionally one or more search parameters identifying a user-entered search query.

If a corresponding action attribute constituting part of the form object submitted by the client is found to match a stored action attribute in the adapter table 40, then the search trail recorder 11 determines that the form about to be submitted is a search form. When a search form is found at step 41 by the search trail recorder, an adapter identifier is transmitted, at step 42, to the search query detector 10 to indicate that the submission of a known search form query has been detected. The adapter identifier returned to the search query detector 10 is maintained in a current adapter identifier table 35.

When an adapter identifier is returned to the search query detector 10, a button 22 on the toolbar 20 displays a recording symbol to indicate to the user that a search trail is about to be recorded. If no search form was found, and no adapter identifier returned, then the recording icon is not displayed. The search user 14 is able to click on the trail recorder button 22 in order to turn the recording button on or off and therefore selectively activate the search trail recording feature of the search trail recorder. The toggling on or off of the search trail recorder is carried out at step 37 of FIG. 3, which has the effect of changing the state of the search trail recorder status data 38 maintained by the search query detector 10. At step 39, the search query detector 10 determines whether the state of the search trail recorder status data 38 indicates that recording should occur, and that a known adapter identifier was returned by the trail recorder 11, the search query detector 10 initiates the recording of the network address of the consecutively accessed sites in the search trail following return of the search query results to the client. An unbroken search trail is constructed from a "chain" of Referrers URL sent from the browser. If a user types in a URL, closes the browser or presses the 'Home' button, the trail is broken because these actions do not cause a 'Referrer' to be sent to the server.

Accordingly, when the search trail recorder function is turned "on", for every DocumentComplete event that is detected at step 30, a separate HTTP GET request is sent by the search query detector 10 to the search trail recorder 11 at step 40 to record a step in the search trail. The parameters sent in the GET request include a unique user identifier, the URL of the current page, the referring URL, the title of the page, the network address of the client, the adapter identifier of the search engine, and the search term or terms used by the user. A server Common Gateway Interface (CGI) program receives these parameters at step 43 and stores them in a RAM based database table 44 maintained by a remote server. A RAM based database table provides the advantage of enabling the rapid insertion and storage of parameters describing every step in the search trail.

Periodically, the RAM based database table 44 is emptied into one of two disk-based tables 45 and 46 by an emptying routine 47 maintained by the search trail recorder 11. The first disk-based table 45 stores data characterising each search trail, whereas the second disk-based table stores data characterising the consecutive sites accessed in each search trail. A new trail is created whenever the adapter identifier located in step 41 is not null (i.e. a user has entered a search query and a search form for a search engine known to the search trail recorder 11). Subsequent entries in the RAM based database table 44 then form steps in the search trail that the user has followed.

For each unique user, each subsequent step in the search trail is entered sequentially in the database table 44. Sometimes a searcher may wander off a search trail or otherwise be distracted. In this case, the database table 44 will record URLs that do not relate to the search term or terms originally entered by the user. To assist in not recording too many irrelevant trail steps, the search trail recorder 11 may limit the length of a search trail to a maximum number of steps or a predetermined maximum elapsed time between the start of the search trail and the current search trail step.

An example of the types of data maintained in the RAM based table 44 and disk-based tables 45 and 46 is set out below. The TrailBucket table 44 stores data temporarily in RAM without accessing the disk drive for speed and scalability. Table 2 illustrates one example of data stored in the table 44.

TABLE 2

| | TrailBucket |
|---|---|
| userid | A unique numerical userid |
| url | The URL last visited by the user |
| referrer | The URL that referred the searcher to the current URL |
| title | The title of the page |
| context | A short context of where the search terms are found on the page |
| ipaddress | The Internet Protocol address of the client machine |
| adapterid | The unique identifier of the search engine where the trail was started |
| searchterm | The search term entered that started the trail |
| visitedon | The date and time the page/form is visited |

The trail table 45 stores the search term that commenced the trail and the source engine (i.e., adapterid), as shown in Table 3.

TABLE 3

| | Trail |
|---|---|
| trailid | A unique number identifying the trail |
| searchterm | The search term enterted that started the trail |
| adapterid | The unique identifier of the search engine where the trail was started |
| ipaddress | The IP address of the machine used |
| userid | A unique numerical userid |
| createdonday | The day on which the trail was created |
| visitcount | The total number of times steps in the trail has been visited |

The TrailStep table 46 records details about the URL visited as shown in Table 4.

TABLE 4

| | TrailStep |
|---|---|
| stepid | A unique number identifying a step in the trail |
| title | The page Title of the URL |
| url | The URL of the page in the step |
| sequence | The order in the trail of the step |
| context | A short snippet of text showing the keyword in context on the target page |
| adapterid | The URL that referred the searcher to the current URL |
| clickedon | The date and time that the step was clicked on |
| visitcount | The number of times this step has been visited |
| createdonday | The day on which the trail step was created |
| weight | The cumulative number of visits to this trail step. The total of all steps is the trail visit count |
| trailid | Foreign key. Uniquely identifies the Trail this TrailStep belongs too |

The adapter table 40 stores details of the search form parameters that drive the underlying search engine, as shown in Table 5.

TABLE 5

| Adapter | |
|---|---|
| adapterid | A unique number identifying a step in the trail |
| shorttitle | A short title for the adapter (e.g., google) |
| title | The title of the search engine that the adapter connects to (e.g., Google Search Engine) |
| url | The URL of the search engine (e.g., http://www.google.com) |
| searchboxurl | The URL of the page the searchbox appears on (e.g., http://www.googe.com) |
| status | The current status of the adapter (e.g., Alive, Dead, Broken, Buried) |
| timetolive | The number of days a broken adapter has to live before the status is changed to dead (e.g., 4) |
| formmethod | The HTTP submission method of the search form (e.g., GET or POST) |
| action | The value of the form action attribute (e.g., http://www.google.com/search) |
| queryparameter | The value of the query parameter that the user enters to use the engine (e.g., q) |
| testquery | An example test query term with which to test the engine (e.g., test) |
| parameters | Other parameters contained in the search form (e.g., ht) |
| lastupdatedon | The time the record was last updated |

As explained previously, the adapter table 40 of known search command formats for the various search engines known to the search trail recorder 11 is managed by the adapter manager 12. The search command formats maintained in the adapter table 40 are periodically validated by the adapter manager 12. The adapter table 40 contains a description which uniquely identifies a search engine's search form. The adapter manager 12 periodically (for example, once a day) tests existing search command formats and connects to new search engines to derive new search command formats. If a search command format is found to be broken, the adapter manager will attempt to repair the broken format. The only information required to adapt to a search engine is the URL of the web page that contains the search box.

In this example of the invention, all other information is automatically gathered by the adapter manager 12. In other embodiments of the invention, a semi-automatic and/or manual process can also be used to increase the accuracy of adapting to the correct form. Accordingly, when a search form URL is transmitted by a search user 14 to the adapter manager 12, the adapter manager initially determines at step 50 whether an existing adapter identifier is present in the adapter table 40 confirming that the search engine located at that URL is already known. If this is the case, a confirmation is returned to the search user 14. Otherwise, the search form URL is transmitted to a form finder component that automatically gathers details about the target search engines search form, including the search form submission method (i.e. GET or POST) and the value of the action attribute (i.e. http//google-.com.search).

Accordingly, at step 51, the form finder component transmits a request for a search form to an external search engine 52. The search page from the corresponding external search engine 52 is then returned to the form finder component at step 53. The form finder component locates the search form from the Document Object Model of the search page and identifies the parameters required to drive the underlying search engine including the query parameters, form submission method, cookie settings and the search URL, at step 54. This parameter identification step is carried out by requesting the HTML source of the search box form page and parsing the HTML source code with an HTML parser. It is often the case that the first form on the page is the search page. Once a form is found, the first text box in the form is used at step 55 to test the search command format (adapter) with the external search engine 52. A test query is transmitted at step 56, which is then processed by the external search engine 52. A test result page is then received by the adapter manager 12 at step 57 when the test query was submitted in the correct search command format. If the result page is found for the test term, the adapter status is set to "live" in the adapter table 40.

The trail searcher 13 enables a searcher to search for their own trails or the trails created by others that match a given search query. Upon receipt of a search query from a search user 14, the trail searcher 13 at step 60, acts to match a search query against previous search queries stored in the trail table 45 to identify related search trails. A full text index on the search term field is carried out to enable the matching to be performed after removing stop words and calculating an Inverse Document Frequency (IDF) value for each match. The trail searcher 13 is adapted to enable a user to limit the search to only their own trails, or optionally to broaden the search to include the search trails of others. At step 61, the order in which the related search results are to be presented to the search user is determined by one or more ranking criteria. The order in which the trail search results are presented may be determined by date, Inverse Document Frequency match, target search engine, user identifier and/or trail weight. A combination of any one or more of these ranking criteria may be selected by the user. In other embodiments, trails may be presented based upon the network address of the client and/or geographic proximity to the user who first traversed the trail.

In embodiments of the invention where the IP address of users is captured by the trail recorder 11, users can choose to search for trails created by other users with their own country, department, organisation or other sub-grouping so that like users can benefit from each others' past searching experiences.

A user can selectively decide to either share or not share their search trail with others. This can be achieved by the addition of an access rights data that users search trails in the trail recorder 11. The access rights data may be added by the user from the trail watcher 10 (for example by selection of a button on the toolbar 20) or by subsequently editing data stored by the trail recorder 11. The trail searcher 13 may then be adapted to only retrieve search trail data for which access rights to third parties have been granted.

The trail weight is incremented each time a step on the trail is visited by a user. A trail's weight is the cumulative weight of all steps in the trails and is initially zero. Whenever a trail step is displayed and the user clicks on a step, a server-side CGI program increments the total weight of the trail step by one (for example, http://turbo10.com/cgi-bin/addweight-.cgi?stepid=2132213). Steps 12 that are clicked on more often acquire more weight. A trail's weight is the sum of all weights of its trail steps. The order of trails in the results step can be displayed in order of decreasing weight with the more traversed trails appearing first. In other embodiments, a trail's weight may gradually decrease over time, to that newer trails can become popular by appearing in the results set earlier. A user may also choose to view other trails that the user has traversed. Accordingly, the ordered search trail results are presented to the user, after formatting at step 62. Any adjustment to the trail weight made at step 63 has the effect of applying a weighting to the steps of the search trail maintained in the trail step table 46, which is then taken into account in the sorting of the related search results at step 61.

It will be understood that the above described client-side and server-side functions carried out by the search query detector 10, search trail recorder 11, adapter manager 12 and trail searcher 13 are carried out by computer programs comprising a series of instructions for causing a programmable apparatus or device to perform desired functionality. In the above described embodiment, the search query detector is embodied by a computer program installed in a client, whereas the trail record 11, adapter manager 12 and trail searcher 13 are computer programs or computer program components maintained at a remote server. In other embodiments of the invention, the trail recorder 11, adapter manager 12 and trail searcher 13 need not necessarily be hosted on a same physical server. Similarly, the adapter table 40, trail table 45, trail step table 46, trail bucket 44 and other tables and databases required for carrying out the above described functionality may be located on the same or a different server from the computer program or programs accessing those databases or tables.

Finally, it is to be understood that various modifications and/or additions may be made to the invention without departing from the spirit or ambit as defined in the claims appended hereto. For example, whilst the embodiments of the invention described above relate to recordal of Internet sites accessed by a client, in other embodiments of the invention the sites may be accessed from with an intranet, extranet or other network running client/server applications.

The invention claimed is:

1. An automated method in a communications network, the method including the steps of:
   detecting submission of a first search query from a client to at least one search engine; and
   storing a search trail corresponding to the first search query, said search trail including at least one trail step comprising identifiers representing two consecutively accessed pages that are accessed by the client via a hyperlink between the pages;
   providing a data storage system on a server storing a plurality of search trails resulting from search queries from a same user and other users, wherein in said plurality of search trails, each trail step has a trail weight based on a number of times the trail step is visited by the same or other users; and,
   receiving a second search query from a client to a search engine; and
   searching the data storage system to match the received second search query to the first search query corresponding to at least one search trail to identify at least one related search trail stored on the data storage system; and,
   presenting search results to the client based upon the at least one related search trail and the trail weight of one or more trail steps comprising the at least one related search trail.

2. The automated method of claim 1, wherein the step of detecting submission of the first search query to at least one search engine includes detecting submission of a completed form object.

3. The automated method of claim 2, wherein the step of detecting submission of a completed form object is performed at the client and includes:
   locating form objects in an object model of content served to a client; and
   adding a routine to each form object to enable interception of the completed form object upon submission.

4. The automated method of claim 3, wherein the step of locating all form objects in a document object model of content served to a client is carried out after the content has been served to the client.

5. The automated method of claim 4, wherein the content is an HTML document, and all form objects in a document object model of the HTML document are located once a browser event, signaling that the browser has finished loading a web page.

6. The automated method of claim 5, wherein the HMTL document includes a GET or a POST form.

7. An automated method as claimed in claim 2 wherein accessing a new page without causing a referrer to be sent to the server includes any one or more of:
   typing a URL of the new page into the browser;
   pressing a home button of a browser.

8. The automated method of claim 1, wherein the step of detecting submission of the first search query to at least one search engine is optionally selectable at the client.

9. The automated method of claim 1, wherein the step of storing a search trail includes:
   recording the URL of the consecutively accessed sites.

10. The automated method of claim 9, wherein the step storing a search trail further includes:
    recording one or more of a user identifier, the network address of the client, and search term or terms entered by the user at the client.

11. The automated method of claim 9, wherein the step of storing a search trail further includes:
    transmitting the one or more parameters of at least one trail step identified at the client to the data storage system of the server for recordal.

12. The automated method of claim 11, and further including:
    initially recording the one or more parameters in a RAM table at the trail recorder server.

13. The automated method of claim 12, and further including:
    periodically saving RAM table data to disk-based tables at the trail recorder server.

14. The automated method of claim 13, wherein a first disk-based table stores data characterising each search trail.

15. The automated method of claim 13, wherein a second disk-based table stores data characterising the consecutively accessed pages in each search trail.

16. The automated method of claim 1, wherein the number of consecutively accessed pages is limited to a predetermined maximum.

17. The automated method of claim 1, wherein the step of searching the data storage system to match the received second search query to the first search query corresponding to at least one search trail includes:
    conducting a full text search on the data storage system for at least part of a search query corresponding to at least one of the plurality of search trails.

18. The automated method of claim 17, wherein step of searching the data storage system to match the received search query to the first search query corresponding to at least one search trail includes:
    limiting the search trails to search trails resulting search queries from a same user as the received second search query.

19. The automated method of claim 1, wherein the step of presenting search results to the client based upon the at least one related search trail includes:
    presenting the related search trails at the client.

20. The automated method of claim 1, wherein the step of presenting search results to the client based upon the at least one related search trail includes:
ordering the related search results by one or more ranking criteria.

21. The automated method of claim 20, wherein the ranking criteria include any one or more of date, inverse document frequency match, target search engine, user identifier, or trail weight indicative of the cumulative frequency of user visits to steps in a related search trail.

22. The automated method of claim 1, wherein the communications network is the Internet, an intranet, an extranet or other network running client/server applications.

23. The automated method of claim 1, wherein the search engine is maintained on the client.

24. The automated method of claim 1, wherein the step of detecting submission of the first search query includes:
determining if part of the form object matches a known search command format of any of a plurality of search engines, and
maintaining an adapter table of known search command formats for a plurality of search engines for identifying one or more search query parameters are entered by a user.

25. The automated method of claim 24, wherein the search command format includes the network address of a search engine program for executing the search query.

26. The automated method of claim 24, and further including:
periodically validating the search command formats maintained in the adapter table.

27. The automated method of claim 24, and further including:
automatically identifying a search command format of a new search engine; and
updating the adapter table.

28. The automated method of claim 24, and further including:
collecting search information identifying a search box page of a search engine; and
identifying the search command format from the search information.

29. The automated method of claim 28, wherein the step of collecting search information includes:
collecting the HTML code of the search box; and
parsing the HTML code to identify the search command format.

30. An automated method as claimed in claim 29 wherein the client accessing a new page from a page corresponding to a search trail without following a hyperlink between the pages, includes:
accessing a new page without causing a referrer to be sent to the server.

31. An automated method as claimed in claim 1 wherein storing a search trail ends in the event that the client accesses a new page from a page corresponding to a search trail without following a hyperlink between the pages.

32. The automated method of claim 1, wherein the step of storing a search trail includes:
increasing a trail weight in response to the number of times a step on the trail is visited by a user.

33. A system for in a communications network for presenting search results to a client based upon a search query, the system including:
a search trail recorder for recording a search trail including at least one trail step comprising identifiers representing two consecutively accessed pages that are accessed by the client via a hyperlink between the pages, each search trail corresponding to a respective search query;
a data storage system for storing a plurality of search trails, the search trails resulting from search queries from a same user and other users, wherein in said plurality of search trails, each trail step has a trail weight based on a number of times the trail step is visited by the same or other users; and,
a server system programmed to provide a trail searcher for searching the data storage system to match a received search query to a search query corresponding to at least one search trail to identify at least one related search trail stored on the server; and to communicate search results to the client based on the at least one related search trail and the trail weight of one or more trail steps comprising the at least one related search trail.

34. The system of claim 33, which includes at least one client including:
a search query detector for detecting submission of a search query from the client to a search engine; and
a search trail recorder for recording a search trail of one or more parameters of sites accessed consecutively following return of search query results to the client.

35. The system of claim 34, wherein the search query detector is a toolbar, browser addon or extension, deskbar, agent, proxy or like client-side application.

36. The system of claim 33, wherein the server system is further programmed to provide:
an adapter manager for maintaining an adapter table of known search command formats for a plurality of search engines for identifying one or more search query parameters are entered by a user.

* * * * *